(12) United States Patent
Hsu

(10) Patent No.: US 10,359,074 B1
(45) Date of Patent: Jul. 23, 2019

(54) MINIATURE SLIDER STRUCTURE AND LINEAR SLIDE

(71) Applicant: CHIEFTEK PRECISION CO., LTD., Tainan (TW)

(72) Inventor: Ming-Che Hsu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 0 days.

(21) Appl. No.: 15/903,418

(22) Filed: Feb. 23, 2018

(51) Int. Cl.
*F16C 29/00* (2006.01)
*F16C 29/04* (2006.01)

(52) U.S. Cl.
CPC .......... *F16C 29/005* (2013.01); *F16C 29/004* (2013.01); *F16C 29/04* (2013.01)

(58) Field of Classification Search
CPC ...... F16C 29/004; F16C 29/005; F16C 29/04; F16C 29/0602; F16C 29/0633; F16C 29/0635; F16C 29/0638; F16C 29/064
See application file for complete search history.

(56) References Cited

U.S. PATENT DOCUMENTS

| 5,531,521 A * | 7/1996 | Ochiai | F16C 29/0635 384/15 |
| 6,957,488 B2 * | 10/2005 | Kawashima | F16C 29/005 384/43 |
| 9,528,549 B2 * | 12/2016 | Kikuchi | F16C 29/064 |
| 2005/0281496 A1 * | 12/2005 | Takahashi | F16C 29/005 384/13 |

* cited by examiner

*Primary Examiner* — James Pilkington
(74) *Attorney, Agent, or Firm* — Rosenberg, Klein & Lee

(57) ABSTRACT

A miniature slider structure having foot portions and a linear slide are provided. The linear slide includes a slider and a slide rail. The slider straddles the slide rail so that the slider can be reciprocated on the slide rail. The slide rail extends in a direction. The slider includes a plate and two opposite foot portions extending downward from the plate. The slider straddles the slide rail through the foot portions. The plate has a mounting surface. Through the polishing process on the mounting surface of the plate, the roughness Ra of the mounting surface is controlled to be in the range of 0.01 microns to 0.1 microns so as to reduce the deformation of the foot portions when the working platform is installed.

4 Claims, 6 Drawing Sheets

MINIATURE SLIDER STRUCTURE AND LINEAR SLIDE

FIELD OF THE INVENTION

The present invention relates to a miniature slider structure having foot portions. The miniature slider structure may be applied to the linear slide or other fields. When the slider and its mounting surface are miniature, the mounting surface of the slider is performed with polish process to control the roughness of the mounting surface so as to reduce the deformation of the foot portions of the slider after the working platform is installed. The linear slide includes a miniature slider and a slide rail. The slider straddles the slide rail to be reciprocated.

BACKGROUND OF THE INVENTION

Referring to FIG. 2, a conventional linear slide comprises a slide rail (1) extending longitudinally and a slider (2) disposed on the slide rail (1), such that the slider (2) can be reciprocated on the slide rail (1). According to the requirements of the working environment, a working platform (3) is further installed on a mounting surface (211) of a platform (21) of the slider (2) so that the working platform (3) can be moved along with the slider (2) to perform the required operation.

In general, the mounting surface (211) of the platform (21) is ground when the slider (2) is manufactured. The roughness Ra can only be controlled at a minimum of about 0.2 microns by grinding.

The inventor found that when the working platform (3) is installed on the mounting surface (211) of the platform (21) of the slider (2) and the mounting surface (211) is reduced to a certain extent, the foot portions (22) of the slider (2) straddling the slide rail (1) is slightly deformed due to the force for locking the working platform (3) to the mounting surface (211). For example, as shown in FIG. 3 and FIG. 4, the foot portions (22) of the slider (2) slightly retract or expand randomly according to different installation conditions. In the figures, the initial interval between the two foot portions (22) is D. When the foot portions (22) are deformed because the mounting surface (211) is mounted with the working platform (3), the interval between the two foot portions (22) is d. In order to indicate the deformation of the foot portions (22) of the slider, the figures are shown with a more exaggerated deformation, which does not represent the deformation of the actual product. When the slider (2) and the mounting surface (211) are smaller, the effect of the roughness of the mounting surface (211) on the deformation of the foot portions (22) is greater after the working platform (3) is installed.

FIG. 5A and FIG. 5B illustrate another impact caused by the deformation of the foot portions (22) of the slider (2). FIG. 5A shows the undeformed configuration. When rolling members (4) are placed between the slider (2) and the inner surfaces of the foot portions (22) respectively, a clearance (t) is formed between the rolling member (4) and the inner surface of the foot portion (22). The clearance is designed to allow the rolling members (4) to roll smoothly without causing the phenomenon that the slider (2) vibrates/shakes or does not run smoothly. As shown in FIG. 5B, when the foot portions (22) of the slider (2) are deformed, for example, the two foot portions (22) are retracted or expanded, and therefore when the rolling members (4) are placed between the slider (2) and the slide rail (1), the clearance between the rolling member (4) and the inner surface of the foot portion (22) of the slider (2) becomes larger or smaller, so that the variation of the clearance is Δt=t'−t. If the variation Δt of the clearance is too big, the slider (2) will vibrate or shake. As a result, the operation error of the working platform (3) becomes larger, affecting the operation precision. If the clearance is too small, the slider is not running smoothly to affect the operation precision.

Referring to FIG. 6, the reason for this phenomenon is that the mounting surface (211) is rough, so that the working platform (3) is in multi-point contact with the mounting surface (211) of the platform (21) of the slider (2). The smaller the mounting surface (211) is, the unevenness of the roughness is more obviously. Therefore, when the mounting surface (211) is mounted with the working platform (3), the mounting surface (211) bears extremely large stress. Because the roughness is uneven, the force is applied unevenly, resulting in deformation of the foot portions (22).

For a larger slider having a larger mounting surface, such unevenness of the surface roughness can be neglected. Because of increased rigidity of the foot portions, the foot portion won't be deformed easily due to the roughness of the mounting surface. Therefore, the deformation can be ignored. For a miniature slider and its mounting surface, the deformation in the application will result in a certain impact on accuracy. For a miniature slide, such a slight deformation will affect the performance of working accuracy. Accordingly, the inventor of the present invention has devoted himself based on his many years of practical experiences to solve these problems.

SUMMARY OF THE INVENTION

In order to overcome the aforesaid shortcomings of the prior art, the primary object of the present invention is to provide a miniature slider structure. The miniature slider structure comprises a platform and two opposite foot portions extending downward from the platform. The platform has a mounting surface. The mounting surface has a roughness Ra in the range of 0.01 microns to 0.1 microns.

According to another aspect of the present invention, a linear slide is provided. The linear slide comprises a slide rail and a slider. The slide rail extends in a direction. The slider comprises a plate and two opposite foot portions extending downward from the plate. The slider straddles the slide rail through the foot portions. The plate has a mounting surface. The mounting surface has a roughness Ra in the range of 0.01 microns to 0.1 microns.

Preferably, the roughness Ra of the mounting surface of the plate is controlled by means of a polishing process.

According to the foregoing technical features, the present invention can achieve the following effects:

Through the more precise polishing process, the roughness of the mounting surface of the platform is controlled without changing the flatness of the mounting surface, so that the deformation of the foot portions can be reduced after the mounting surface is mounted with the working platform, thereby improving the working accuracy of the working platform.

Figure 2:
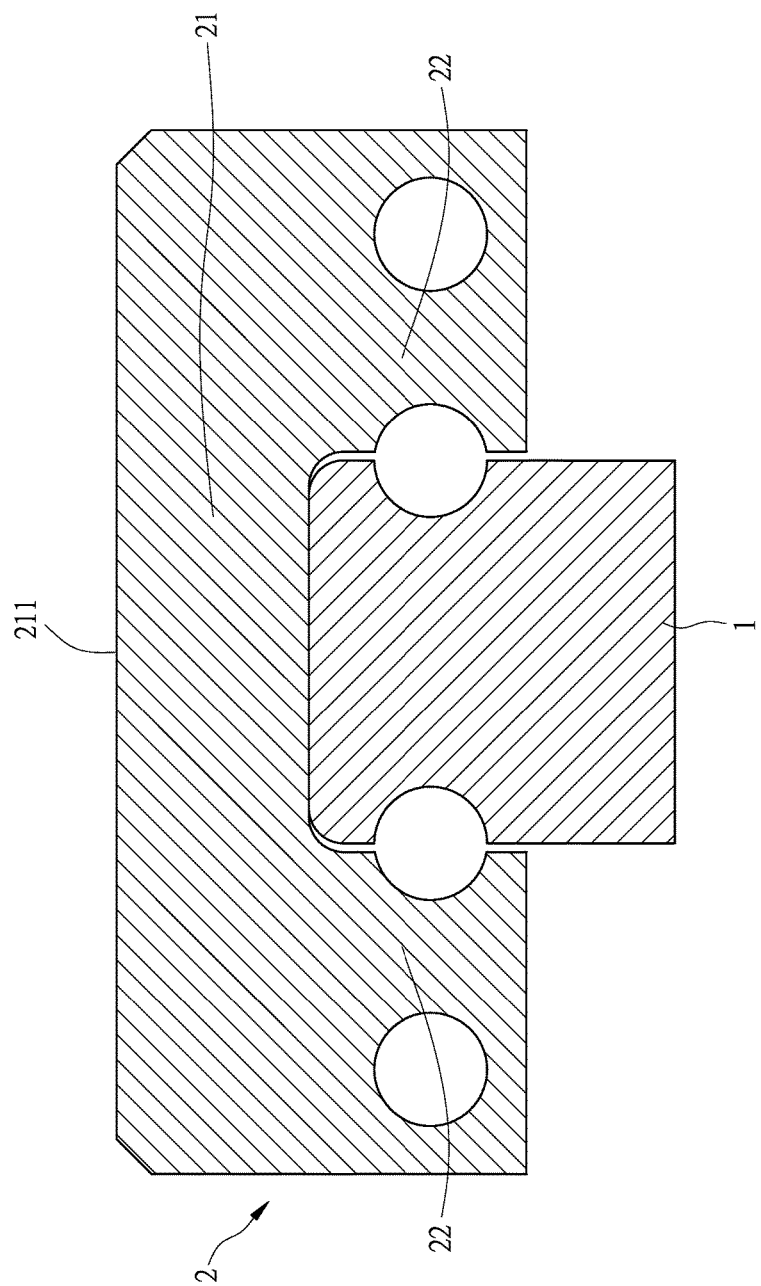
Figure 3:
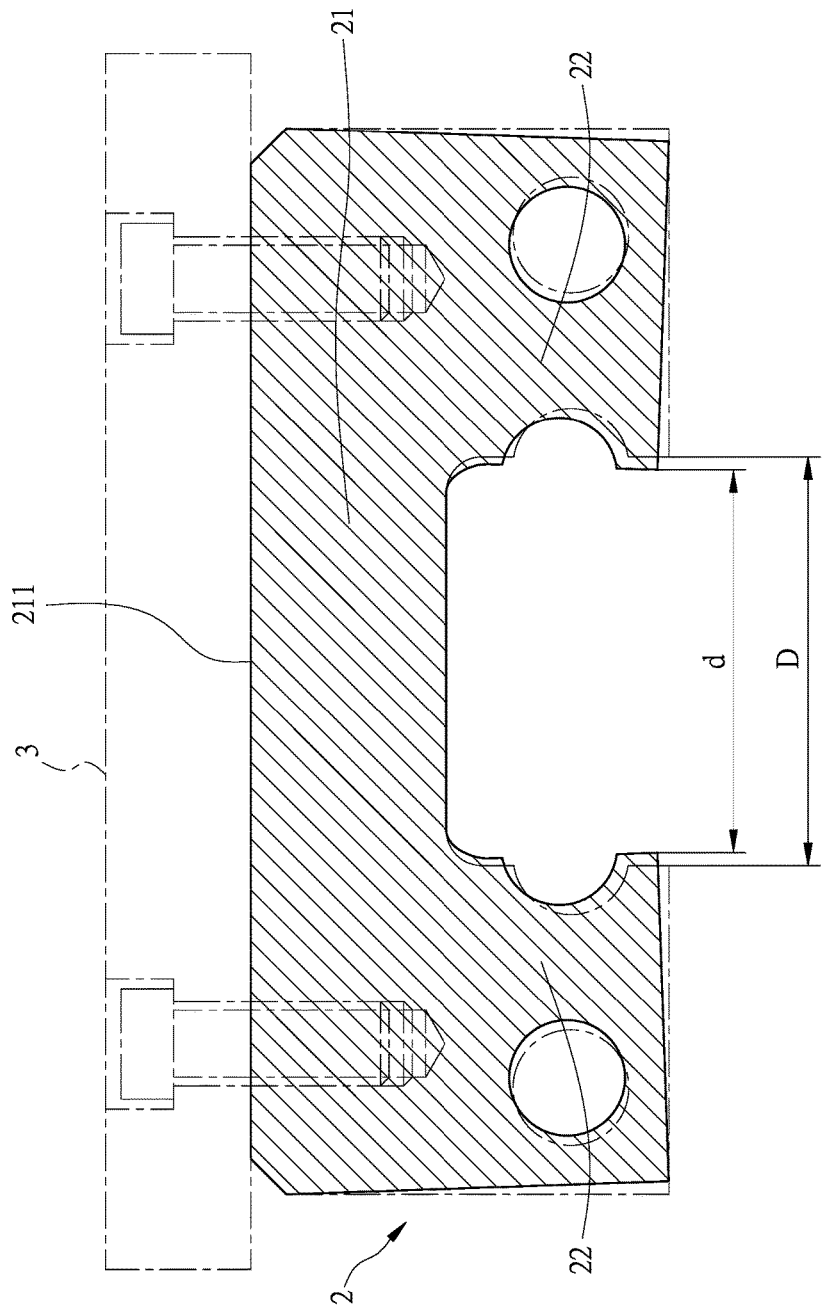
Figure 4:
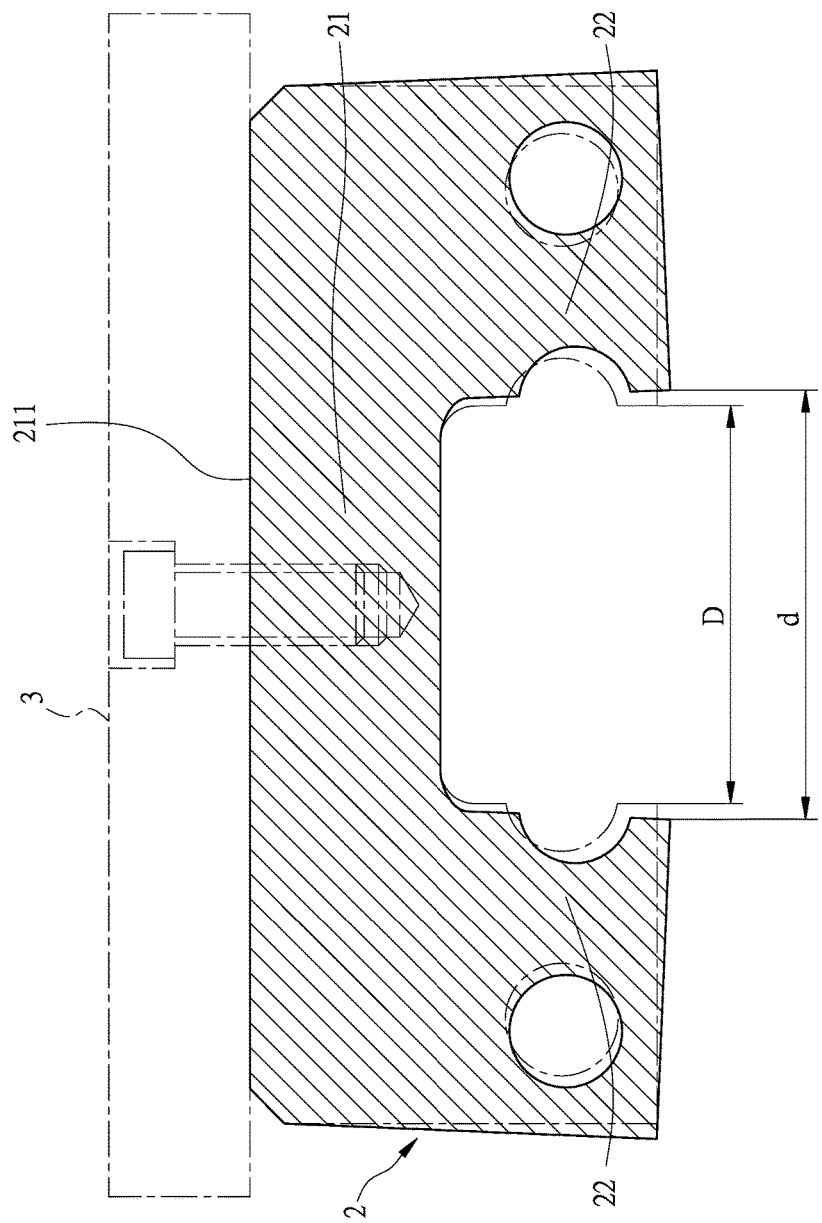
Figure 5B:
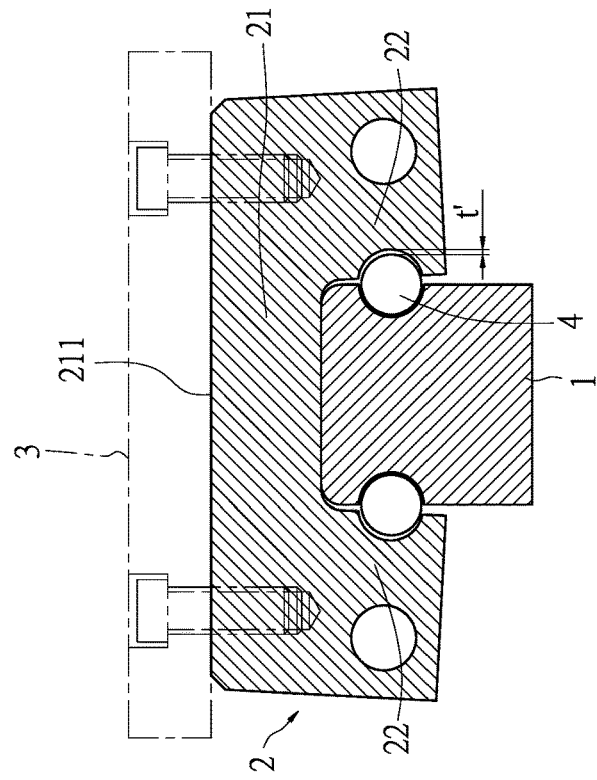
Figure 5A:
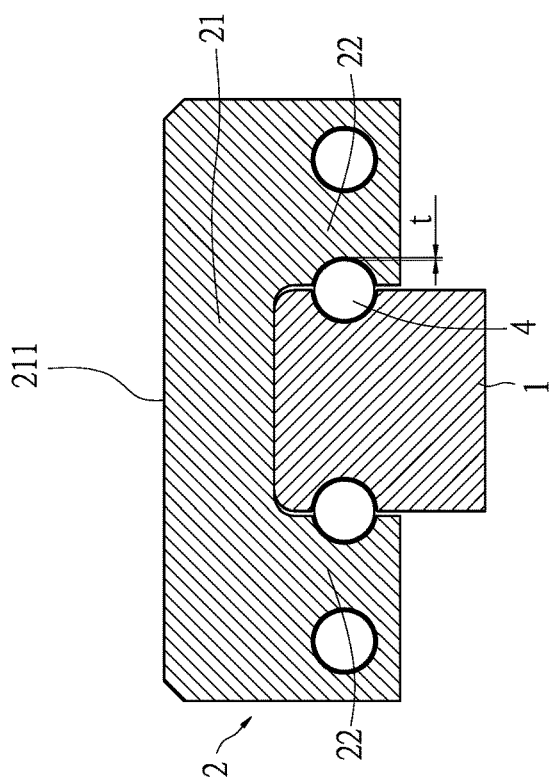
Figure 6:
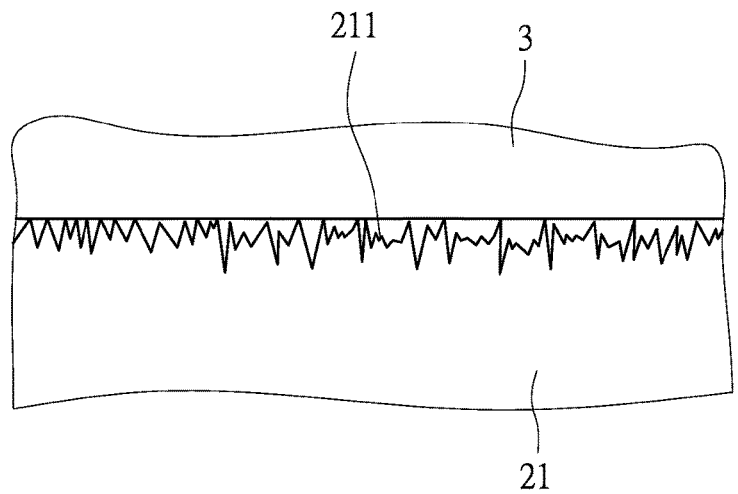

FIG. 2 is a sectional view of the conventional linear slide;

FIG. 3 is a first schematic view showing the deformation of the foot portions after the mounting surface of the slider of the conventional linear slide is mounted with the working platform;

FIG. 4 is a second schematic view showing the deformation of the foot portions after the mounting surface of the slider of the conventional linear slide is mounted with the working platform;

FIG. 5A is a schematic view showing the clearance t between the rolling member and the inner surface of the foot portion of the slider under a normal condition after the mounting surface of the slider of the conventional linear slide is mounted with the working platform;

FIG. 5B is a schematic view showing the clearance t' between the rolling member and the inner surface of the foot portion of the slider when the foot portions are deformed by stress after the mounting surface of the slider of the conventional linear slide is mounted with the working platform; and FIG. 6 is a schematic view showing the working platform is in multi-point contact with the mounting surface of the slider of the conventional linear slide.

DETAILED DESCRIPTION OF THE PREFERRED EMBODIMENTS

Embodiments of the present invention will now be described, by way of example only, with reference to the accompanying drawings.

In summary of the above technical features, the main effect of the miniature slider structure and the linear slide of the present invention will be clearly shown in the following embodiments. Although the following embodiments are described for a linear slide, but the miniature slider of the present invention is not limited to the use of the linear slide.

The linear slide according to an embodiment of the present invention comprises a slide rail and a slider. The slide rail extends in a direction. The slider comprises a platform and two opposite foot portions extending downward from the platform. The slider straddles the slide rail through the foot portions. The platform has a mounting surface. The mounting surface has a roughness Ra in the range of 0.01 microns to 0.1 microns. The roughness Ra of the mounting surface of the platform is controlled by means of a polishing process.

The arrangement relationship between the slide rail and the slider has been described in the background of the invention. In the present embodiment, only the actual experiment of the roughness of the mounting surface of the platform according to the present invention is presented to illustrate the deformation of the foot portions of the slider when the working platform is not locked to the slider and after the working platform is locked to the slider. In addition, when the working platform is not locked to the slider and after the working platform is locked to the slider, the deformation of the mounting surface of the platform of the conventional slider seat is provided for comparison so as to illustrate the effect of the invention.

Figure 1:
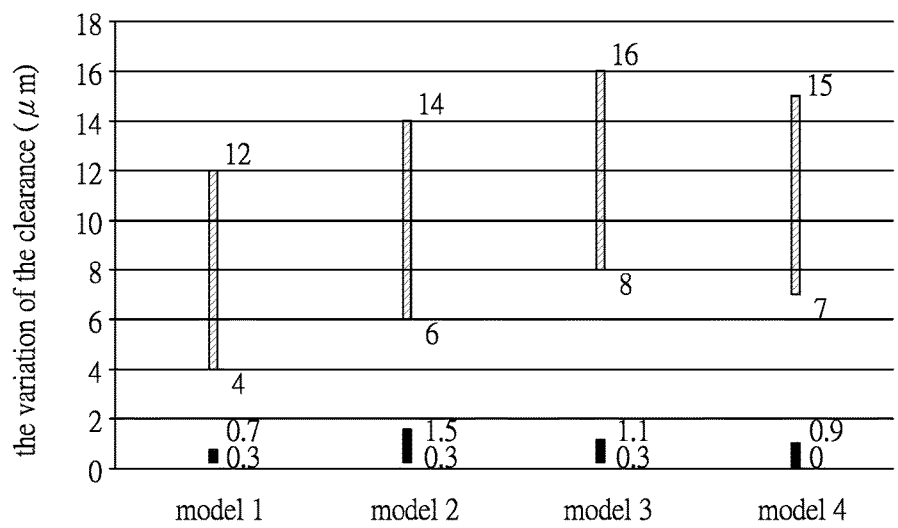
FIG. 1 is an experimental data comparison chart showing the deformation of the foot portions of the slider, in a conventional linear slide, the mounting surface of the platform of the slider is performed with a grinding process, the roughness Ra is generally greater than or equal to 0.2 microns when the mounting surface is mounted with the working platform; in the linear slide of the present invention, the mounting surface of the platform of the slider is performed with a polishing process, the roughness Ra is controlled in the range 0.01 microns to 0.1 microns when the mounting surface is mounted with the working platform.

Referring to FIG. 1, experiments are carried out on a batch of sliders whose roughness Ra of the mounting surface is controlled to 0.2 micrometers according to the conventional grinding method, and different sizes of model 1, model 2, model 3 and model 4 are used. The sizes of the mounting surfaces of the sliders are 160 mm$^2$, 120 mm$^2$, 90 mm$^2$, 50 mm$^2$. It can be seen from the figure that when the mounting surface of the slider is mounted with the working platform, irregular deformation of the foot portions of the slider is distributed in the range of 4 micrometers to 16 micrometers.

For miniature linear slides, $\Delta t$ difference values will be generated as shown in FIG. 5A and FIG. 5B. Wherein, $\Delta t=t'-t$, which is the difference value between the clearance (t) defined between each rolling member (4) and the inner surface of each foot portion (22) of the slider (2) before the working platform (3) is locked to the slider and the clearance (t) defined between each rolling member (4) and the inner surface of each foot portion (22) of the slider (2) after the working platform (3) is locked to the slider (2), thus causing the clearance to be too large or too small. Such a difference value $\Delta t$ is enough to affect the working accuracy of the working platform.

Through the present invention, the batch of model 1, model 2, model 3, model 4 are performed with the polishing process to control the roughness of the mounting surface and maintain the original flatness. As shown in the figure, after the mounting surface of the platform is polished and the mounting surface is mounted with the working platform, the deformation of the foot portions of the slider is in the range of 0.3 μm to 1.2 μm and the difference value $\Delta t$ becomes extremely small, thereby greatly enhancing the working precision of the miniature linear slide after the working platform is mounted.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A slider structure, comprising: a plate and two opposite foot portions extending downward from the plate, the plate having a mounting surface, the mounting surface having a roughness Ra in the range of 0.01 microns to 0.1 microns.

2. The slider structure as claimed in claim 1, wherein the roughness Ra of the mounting surface of the plate is controlled by means of a polishing process.

3. A linear slide, comprising:
   a slide rail, extending in a direction;
   a slider, including:
   a plate and two opposite foot portions extending downward from the plate, the foot portions of the slider straddling the slide rail, the plate having a mounting surface, the mounting surface having a roughness Ra in the range of 0.01 microns to 0.1 microns.

4. The linear slide as claimed in claim 3, wherein the roughness Ra of the mounting surface of the platform is controlled by means of a polishing process.

* * * * *